United States Patent [19]

Löblich

[11] Patent Number: 4,536,376
[45] Date of Patent: Aug. 20, 1985

[54] METHOD OF PRODUCING POTASSIUM MAGNESIUM PHOSPHATE

[75] Inventor: Karl-Richard Löblich, Barsinghausen, Fed. Rep. of Germany

[73] Assignee: Kali und Salz AG, Kassel, Fed. Rep. of Germany

[21] Appl. No.: 492,162

[22] Filed: Jun. 13, 1983

[30] Foreign Application Priority Data

May 6, 1983 [DE] Fed. Rep. of Germany ....... 3216973

[51] Int. Cl.³ .............................................. C01B 25/26
[52] U.S. Cl. ......................................... 423/306; 71/41
[58] Field of Search .............................. 423/306; 71/41

[56] References Cited

U.S. PATENT DOCUMENTS 4,217,333 8/1980 Löblich .............................. 423/306

Primary Examiner—John Doll
Assistant Examiner—Wayne A. Langel
Attorney, Agent, or Firm—Michael J. Striker

[57] ABSTRACT

Process for producing potassium magnesium phosphate by reacting basic magnesium compounds with phosphoric acid or phosphates in the presence of potassium sulfate from a mother liquor containing per 1000 g water up to 150 g magnesium sulfate and up to 120 g potassium sulfate. Precipitation forms with addition of calcium oxide or hydroxide equimolar to present magnesium sulfate and after phosphoric acid adjustment of the pH to 2–4, mechanical separation and addition of potassium sulfate and basic magnesium compounds, the desired product results.

13 Claims, 1 Drawing Figure

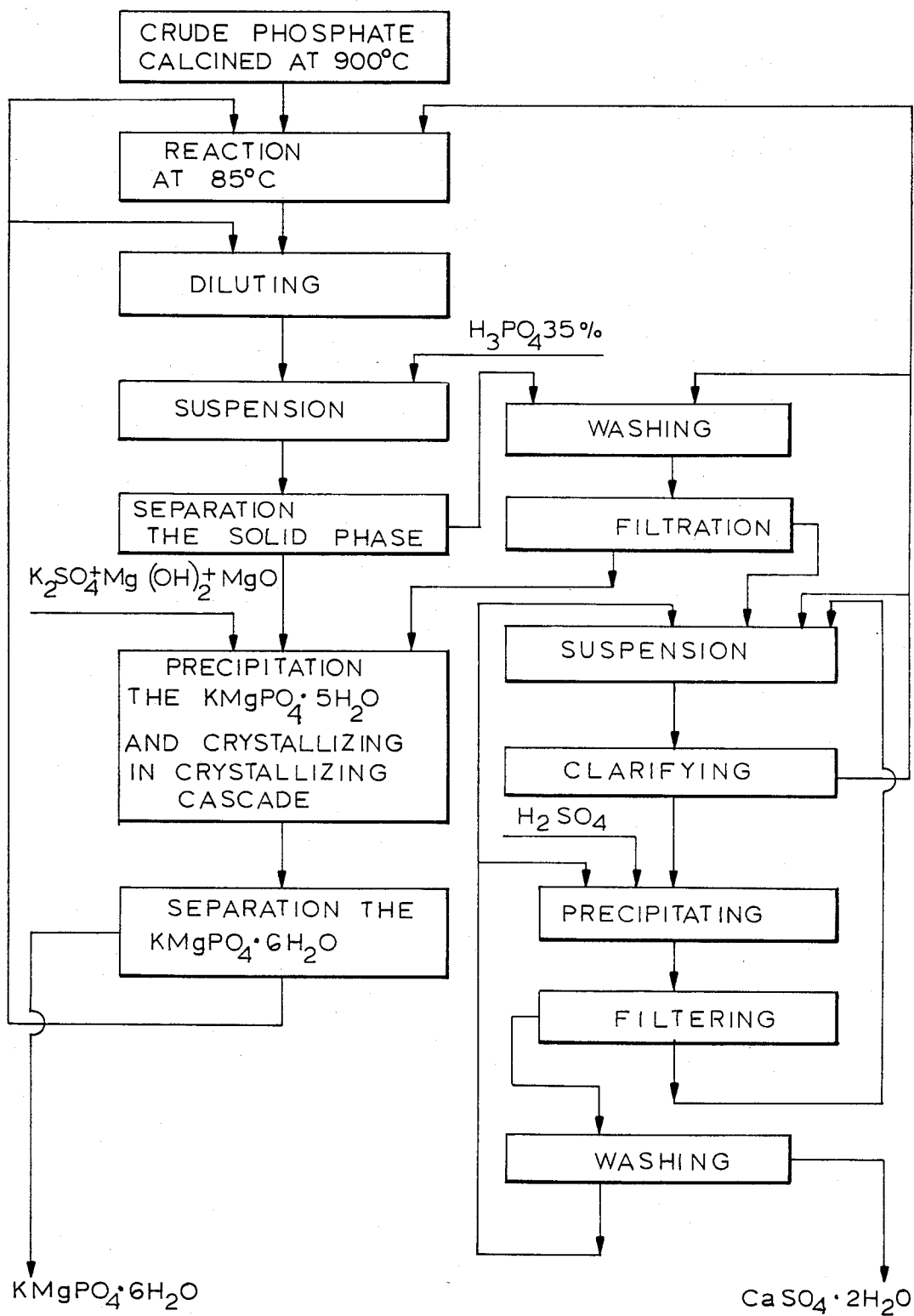

METHOD OF PRODUCING POTASSIUM MAGNESIUM PHOSPHATE

BACKGROUND OF THE INVENTION

Magnesium is an important plant nutrient component for those requiring for life chlorophyll. It also promotes root withdrawal of the plant nutrient phosphorus.

On account of the fact of the agronomo/culturally efficient utilization of tillable ground, considerable amounts of magnesium are removed, and since magnesium loss further takes place through washing out or fixation in the ground, a sufficient provision of the agricultural culture plants with magnesium is assured in many cases only by means of applying magnesium-containing fertilizer.

Previously, the amounts of magnesium hereby removed or threin the earth fixed are replaced by addition of magnesium-containing mineral fertilizers such as for example potassium fertilizer salt or magnesium-containing multiple nutrient fertilizer. For ameliorating acute magnesium deficiency in the soil, previously kieserite is frequently also employed.

A good provision of magnesium as well as potassium and phosphorus for the plants can be guaranteed by fertilizing with potassium magnesium phosphate. This compound contains no "ballast" material and can also be worked up into multi-nutrient fertilizer. Such multi-nutrient fertilizer possesses a high total nutrient content. They are described for example in DE-PS Nos. 11 52 210 and 15 92 903 which are hereby incorporated by reference.

Several production methods for potassium magnesium phosphate are already known, according to which the compound can be obtained water-free as monohydrate or as hexahydrate. Potassium hydrogen phosphate is reacted with magnesium oxide respectively carbonate in amounts of water bound thereby as water of crystallization.

According to a further production technique the potassium magnesium phosphate hexahydrate was obtained by reaction of Engel's salts ($MgCo_3.KHCO_3.4-H_2O$) with phosphoric acid. See, e.g. Gmelins Handbuch der Anorganischem Chemie, 8. Auflage, System-Nr. 27 (B), Liefuring 4 (1939), pages 465–466. For this technique the potassium salt must first however be prepared through the additional technique expenditure of potassium chloride.

According to the teachings of FR-PS No. 722378, products are formed by kneading calcium dihydrogen phosphate with potassium sulfate and magnesium oxide containing potassium magnesium phosphate.

Similar products were described in DE-AS No. 17 67329, produced by working in of potassium sulfate into an acid, calcium and magnesium phosphate containing base mass. Such products are however contaminated with calcium sulfate.

In DE-PS No. 619 397 it is therefore recommended to heat potassium chloride with magnesium chloride and phosphoric acid until chlorhydrogen no longer escapes and the formation of the potassium magnesium phosphate is terminated. The technical accoutrements for the performance of this process must be composed however from corrosion-resistant material and, moreover, the exhaust gas must be removed under additional technical cost without injury to the environment.

From JP-AS No. 72 17 694, BE-PS No. 64 81 111 and GP-PS No. 969 419 it is known to precipitate potassium magnesium phosphate from sea water in contaminated form. A process for producing potassium magnesium phosphate by conversion of magnesium oxide and potassium hydroxide is described in DE-OS No. 19 24 284 with phosphoric acid.

Further procedures are known from DE-PS No. 12 65 726, U.S. Pat. No. 3,615,186 and BE-PS No. 740307. Whereby potassium magnesium phosphate is produced in the presence of organic amine through reaction from potassium and magnesium chloride respectively sulfate with phosphoric acid. The use of amine makes necessary however an additional technical purification of the potassium magnesium phosphate, which can only be realized through further expense.

DE-PS No. 28 31 672 suggests a process for producing potassium magnesium phosphate by reacting from acid, phosphate ion containing aqueous solution and potassium chloride and basic reacting magnesium compounds. According to an other as yet unpublished suggestion, potassium magnesium phosphate can be produced from sulfate mother liquor, whereby aside from potassium sulfate also potassium chloride is employed as potassium component.

With both techniques the mother liquor must be set out of the potassium magnesium phosphate crystallization and can not again be employed in the process.

SUMMARY OF THE INVENTION

Accordingly search has been made for possibilities of obtaining potassium magnesium phosphate without additional and technically expensive measures, without use of adjuvants and with repeat use of the mother liquor of the potassium magnesium phosphate crystallization.

These objects have been satisfied by discovery according to the present invention of a process for the production of potassium magnesium phosphate through reaction of basic magnesium compounds with phosphoric acid or phosphates in the presence of a potassium sulfate excess, wherefrom the formed potassium magnesium phosphate is separated from the mother liquor, washed with water and dried.

Accordingly, into a mother liquor arising from the process which contains 80–150 g magnesium sulfate and 80–120 g potassium sulfate per 1000 g water is stirred a free calcium oxide and/or -hydroxide containing material at a temperature between about 60° and 90° C. in an amount corresponding to an equimolar ratio of free calcium oxide respectively-hydroxide and dissolved magnesium sulfate, wherefrom in the arising turbidity a pH-value of 2 up to 4 is adjusted by the addition of phosphoric acid, the acid solution is separated from residue and stirred with an amount of potassium sulfate sufficient for maintaining the potassium sulfate content of the mother liquor and simultaneously the pH-value of the reaction mixture is increased to 8.0 up to 8.6 through the addition of a basic magnesium compound, whereupon the crystallizate falling therefrom the reaction mixture held at a temperature of 30° up to 40° C. as product is separated from the mother liquor, which is recycled to the start of the process.

According to the process of the present invention initially a suspension of magnesium hydroxide and calcium sulfate is formed through the addition of the calcium oxide and/or -hydroxide containing material into the mother liquor, which subsequently is brought to a pH-value from 2 up to 4 through the addition of phosphoric acid. As calcium oxide and/or -hydroxide containing materials suitable herein may be mentioned burnt lime, slaked lime and also calcium dihydrogen phosphate. From the potassium salt containing magnesium dihydrogen phosphate solution the calcium sulfate is separated, wherefrom is added to the remaining solution of potassium sulfate in an amount which suffices for the formation of the potassium magnesium phosphate and for the maintenance of the potassium sulfate content of the mother liquor. Simultaneously, the pH-value of this solution is adjusted to 8.0 up to 8.6 through the addition of the basic magnesium compound. Selected herewith as basic magnesium compounds are high and of average activity magnesium oxide, their hydration products, as well as precipitated magnesium hydroxide.

The temperature of the reaction mixture is adjusted to 30° up to 40° C. and held to this value during the subsequent crystallization. Then the potassium magnesium phosphate crystallizes out from the reaction mixture.

The crystallization of the potassium magnesium phosphate is preferably performed in a crystallization cascade. It has proven to be advantageous to supply potassium magnesium phosphate seed crystals into the mother liquor. Through this measure is obtained as product a coarse crystallizate, good for washing and drying. The product is separated from the mother liquor and, as hexahydrate, dried, or calcined until freeness from water.

The process according to the present invention is based upon the determination that within a determined temperature range the calcium sulfate respectively its hydrate can be precipitated from a magnesium and potassium salt containing solution without simultaneous formation of potassium containing double salts, such as for example syngenite with calcium oxide and/or -hydroxide. This temperature range stretches from 60° up to 90° C. The calcium sulfate precipitates under such conditions from solutions which aside from the magnesium salt contain 80 up to 120 g potassium sulfate as potassium-free crystallizate, which is separated from the liquid phase.

With the process according to the present invention it is attained that through the reaction of the magnesium sulfate the mother liquor into magnesium dihydrogen phosphate is accessible thereby the magnesium from the magnesium sulfate to a utilization with the formation of the potassium magnesium phosphate.

According to an embodiment of the process according to the present invention the mother liquor can be added with instead of calcium oxide and/or -hydroxide containing material, advantageously a burnt lime-rich crude phosphate. Herewith precipitates from the mother liquor an apatite containing calcium sulfate, which, after the reaction with sulfuric acid and separation of the calcium sulfate, produces phosphoric acid, which is brought into the process for the reaction of the magnesium hydroxide into magnesium dihydrogen phosphate. Through the employment of lime-rich burnt crude phosphate as calcium oxide carrier, such phosphate raw material is converted into highly valuable technical products.

Both of the partial steps of the process according to the present invention, namely the precipitation of the sulfate with calcium oxide and/or hydroxide and the dissolving of the magnesium hydroxide with phosphoric acid solution into magnesium dihydrogen phosphate can thereby be summarized in that the mother liquor is added with calcium dihydrogen phosphate in appropriate amounts instead of the calcium oxide respectively -hydroxide containing material.

According to an advantageous embodiment of the process according to the present invention, the reaction mixture can be classification sedimented from the mother liquor and the calcium oxide and/or -hydroxide containing material. In this manner are obtained three fractions, namely a fraction I which contains concentrated all undissolved solids; a fraction II enriched in magnesium hydroxide but depleted of other solids; and a fraction III solids-free potassium salt solution.

The fraction I contains the main amount of the reaction product from the reaction of the mother liquor with the calcium oxide and/or -hydroxide containing material. The suspension is brought with phosphoric acid to a pH-value between 2 and 4 and from then still remaining solids are separated. The acid solution is reacted with the necessary amount of potassium sulfate and basic magnesium compound and the potassium magnesium phosphate crystallization is conducted. Here the reaction mixture is added with fraction II for adjusting the pH-value from 8.0 up to 8.6. After the reaction the crude potassium magnesium phosphate is separated from the mother liquor and brought into contact with the fraction III, which represents a nearly pure potassium sulfate solution. In this manner mother liquor residue is driven out and unpurified magnesium phosphate converted. The process according to the present invention makes possible the production of potassium magnesium phosphate from easily accessible starting materials. The technical advance represented by the present invention is that the mother liquor is led in circulation and its evaporation, its exploitation for use in a coupled operation not belonging to the potassium magnesium phosphate process, or even its rejection is avoided. By means of the holding of defined temperature conditions upon the precipitation of the calcium sulfate from the mother liquor according to the present invention the formation of potassium-containing double salts is precluded, so that with the process of the invention no potassium loss occurs. Thereby the total conversion approaches that defined by the stoichiometry, wherefrom a high yield of phosphate, potassium and magnesium is provided. In other respects the process according to the present invention makes possible the conversion of phosphorus-poor crude phosphate with high calcite portion into a fertilizer with high total nutrient content. Coming into consideration for the process according to the present invention as poor value crude phosphate are not only the crude phosphate obtained from inferior deposits, but also phosphate-containing intermediate products from the preparation of crude phosphates of average quality, the use of which previously was too expensive technically.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic representation or flow sheet to Example 3 setting forth the process according to the present invention.

DESCRIPTION OF THE PREFERRED EMBODIMENTS

EXAMPLE 1

1.041 m$^3$ mother liquor of composition 100 g K$_2$SO$_4$, 80 g MgSO$_4$ and 0.3 g P$_2$O$_5$ in 1000 g water are stirred with 0.06 m$^3$ wash water arising from the washing of calcium sulfate semihydrate, and with 238 g technical calcium dihydrogen phosphate containing 9% valuable material and 10% moisture, at a temperature of 82° C. After a stirring period of 30 minutes the solids are separated from the solution. The solids are washed with water whereby 0.06 m$^3$ wash water is produced. The washed solids weight 261 kg in moist state, composed predominantly of calcium sulfate semihydrate and containing 6.4% by weight P$_2$O$_5$ and 0.7% by weight K$_2$O. It is. The 1.09 m$^3$ solution separated from calcium sulfate semihydrate contains 121 g magnesium dihydrogen phosphate, 18 g free phosphoric acid, 93 g potassium sulfate and 8 g magnesium sulfate in 1000 g water. This solution is cooled down, and to it are provided 113 kg potassium sulfate (with 52.4% K$_2$O) and 0.12 m$^3$ water. Into this mixture is re-led 1 m$^3$ mother liquor from the potassium magnesium phosphate crystallization.

The mixture is introduced into a crystallization cascade of 5 stirrer vessels, into which first of said stirrer vessels 64.1 kg of a highly active magnesium oxide having an iodine number of 88 and 87% by weight reactive MgO is incorporated at a temperature of 39° C. under intensive stirring. After the coursing of the crystallization mixture through the five stirrer vessels of the crystallization cascade the crystallization of the potassium magnesium phosphate-hexhydrate is completed. 348 kg potassium magnesium phosphate are newly formed as hexahydrate.

The product is separated from 2.04 m$^3$ mother liquor which has a composition 100 g potassium sulfate, 80 g magnesium sulfate and 0.3 g P$_2$O$_5$ in 1000 g water. The mother liquor is separated into two nearly equal volume portions, of which the one is recycled into the reaction with calcium dihydrogen phosphate at the start of the process and the other part as diluting agent into the crystallization cascade.

After a displacement washing the product is dried as hexahydrate. It has the following nutrient content: 26.3% by weight P$_2$O$_5$, 16.5% by weight K$_2$O, and 15.4% by weight MgO. The yields amount to P$_2$O$_5$ 84.5%, K$_2$O 96.9% and MgO 96.1%.

EXAMPLE 2

In 1.045 m$^3$ mother liquor with 95 g potassium sulfate, 15 g potassium chloride and 84 g magnesium sulfate in 1000 g water, at a temperature of 62° C. 58 kg finely divided technical calcium hydroxide having 88% by weight reactive Ca(OH)$_2$ are placed under powerful stirring. After a lodging period of 20 min the reaction mixture is introduced into a clarifier into which enters sedimentation the precipitation product. Three fractionss are obtained, namely 0.182 m$^3$ clear solution (I) with 97 g potassium sulfate, 15 g potassium chloride and 7.9 g dissolved calcium sulfate in 1000 g water, 0.11 m$^3$ potassium sulfate solution (II) with 45 g magnesium hydroxide and a trace of undissolved calcium sulfate in 1000 g water and 0.776 m$^3$ suspension (III) with 7.9 g dissolved calcium sulfate and 51 g magnesium hydroxide in 1000 g water. The clear potassium salt solution (I) is intermediately piled up. Into the suspension (III) are stirred at a temperature of 62° C. 406 kg of a 35% by weight phosphoric acid solution. After 10 minutes lodging time the formed solid phase is separated from the reaction solution and subjected to a displacing washing. The solid phase is composed predominantly of calcium sulfate-dihydrate. Its amount dry comes to 120 kg with a content of 1.4% by weight P$_2$O$_5$ and 0.8% by weight K$_2$O. The solid phase is led out and The (1.06 m$^3$ of) phosphoric acid solution separated from calcium sulfate-dihydrate contains in 1000 g water 75 g potassium sulfate, 12 g potassium chloride, 150 g magnesium dihydrogen phosphate, 5 g free phosphoric acid and 7 g calcium sulfate.

1.06 m$^3$ of the phosphoric acid solution is after cooling down to a temperature of about 40° C. mixed with 1.1 m$^3$ recycled mother liquor from the potassium magnesium phosphate crystallization and introduced to the crystallization cascade.

With the holding of a temperature of 40° C. maximum 94 kg dried technical magnesium hydroxide having 95% by weight Mg(OH)$_2$ and 136 kg technical potassium sulfate having 52.3% by weight K$_2$O, 1% by weight MgO and 1.4% by weight Cl is stirred into the first stirrer vessel of a crystallization cascade composed of six stirrer vessels, with high tangential stress.

Into the third stirrer vessel of the crystallization cascade is added the 0.11 m$^3$ K$_2$SO$_4$-solution (II) with 45 g Mg(OH)$_2$ for adjusting the pH-value to 8.5, whereby the crystallization of the potassium magnesium phosphate-hexahydrate is accelerated. After leaving the sixth stirrer vessel the reaction comes to a standstill. The lodging time of the crystallization mixture in the crystallization cascade comes to about 30 minutes. The product, composed predominantly of potassium magnesium phosphate-hexahydrate is separated from the mother liquor. The mother liquor residue adhering to the product is displaced on the filter through delivery of 0.182 m$^3$ clear potassium salt solution (I) from the clarifier.

From the product, 2.15 m$^3$ mother liquor are separated, which contain 95 g potassium sulfate, 15 g potassium chloride and 84 g magnesium sulfate in 1000 g water. Of the mother liquor, 1.045 m$^3$ to the start of the process for treatment with Ca(OH)$_2$ and about 1.1 m$^3$ as admixture to the phosphoric acid solution are recycled upon entrance into the crystallization cascade.

578 kg moist product are obtained, wherefrom upon drying to hexahydrate 400 kg dry product of the following contents is provided: 84.5% by weight KMgPO$_4$.6-H$_2$O, 5.0% by weight sulfate and chloride of potassium, 7.5% by weight other phosphate, 3.0% by weight inert impurities.

Converting of the figures provides for the obtained potassium magnesium phosphate-hexahydrate: 25.3% P$_2$O$_5$, 17.6% K$_2$O, 15.5% MgO, 2.5% SO$_3$, 0.4% Cl.

The yields of P$_2$O$_5$ and of MgO are nearly 98%, that for K$_2$O nearly 99%.

By means of calcination one obtains from the hexahydrate a technical product with 38% by weight P$_2$O$_5$, 2.65% by weight K$_2$O and 23% by weight MgO.

EXAMPLE 3

Into a first stage 405 kg of a crude phosphate having 18.5% calcite content are calcined at a temperature of 900° C. into 374 kg of a phosphate containing 30.7% by weight P$_2$O$_5$ and 10.3% by weight free and reactive calcium oxide with a CaO-total-content of 58.9% by weight CaO.

Into a second stage are mixed 374 kg of the calcined crude phosphate with 1.05 m³ of the mother liquor of the potassium magnesium phosphate crystallization and converted at a temperature of 85° C. The reaction mixture is subsequently diluted with a further 4.29 m³ mother liquor of the potassium magnesium phosphate crystallization into a suspension into which are stirred 402 kg of a 35% phosphoric acid (25.3% by weight $P_2O_5$). After a stirring period of 10 minutes at a temperature of 85° C. the solid phase (apatite and calcium sulfate) is separated from the liquid phase. The solid phase separated as residue is washed with 0.3 m³ 35% phosphoric acid. The wash liquid is admixed with the liquid phase so that 5.12 m³ phosphoric acid solution is produced which contains the magnesium dihydrogen phosphate in addition to potassium and magnesium sulfate.

There remains as residue 800 kg of the moist solid phase, which in stage 3 is carried in 1.7 m³ 35% phosphoric acid and is reacted with 1.49 m³ of a sulfuric acid solution from the next to be described stage 4. Therewith the temperature of this mixture is held at 75° C. After the attenuation of the reaction 3.63 m³ of this suspension is added to a clarifier. After the following clarification is withdrawn as overcourse 2.4 m³ clear phosphoric acid solution with a content of 35% by weight $H_3PO_4$ which are apportioned as follows:

0.3 m³ are used for washing the solid phase separated as residue, 1.7 m³ in stage 3 for wetting this residue and 0.34 m³ corresponding 402 kg phosphoric acid with a content of 35% by weight are employed in the reaction mixture of mother liquor and calcined crude phosphate in stage 2. As lower course are tapped 1.3 m³ of a suspension with 526 g/l solids. They are introduced into stage 4, in which they are stirred at a temperature of 75° C. with 282 kg 96% by weight technical sulfuric acid and with 0.36 m³ wash solution from the after provided wash of the calcium sulfate. With the accessioned filtration and washing with 0.82 m³ water, 1133 kg moist gypsum and scant 1.5 m³ sulfuric acid solution for the decomposition of the phosphate residue in stage 3 are recovered.

The 1133 kg of filter residue from stage 4 corresponding 680 kg dry calcium sulfate-dihydrate which still contains 1.9% by weight $P_2O5$ and 0.4% by weight $K_2O$. From this is lead out calcium sulfate.

The 5.12 m³ of phosphoric acid potassium salt containing magnesium dihydrogen phosphate solution from stage 2 is cooled to a temperature of 40° C. Upon entry into the of six stirrer vessel composed crystallization cascade this solution, in the first stirrer vessel, under intensive stirring with a high shear force of 107 kg is added with a technical magnesium hydroxide with a content of 95% by weight $Mg(OH)_2$ and 134 kg of a technical potassium sulfate with 49.0% by weight $K_2O$, 3.2% by weight MgO and 9.9% by weight Cl.

In one of the following stirrer vessels the pH-value of the crystallization mixture is after adjusted to 8.5. 3.5 kg of an active magnesium oxide with an iodine number of 90 is necessary. The crystallization mixture is held to a temperature of 38° C. and runs through the crystallization cascade in 25 minutes.

After leaving the crystallization cascade, the crystallized hexahydrate of the potassium magnesium phosphate is separated from the mother liquor. The mother liquor contains 92 g potassium sulfate, 16 kg potassium chloride and 82 g magnesium sulfate of 1000 g water.

After a brief displacement wash with water, 597 kg moist product and 5.34 m³ mother liquor are obtained of the mother liquor, 1.05 m³ for reaction with the calcined crude phosphate of stage 2 and 4.29 m³ for dilution of this reaction mixture are recycled.

Upon drying and calcining of the moist product, 287 kg potassium magnesium phosphate with 35.5% by weight $P_2O5$, 21.9% by weight $K_2O$, 52.7% by weight MgO, 6.6% by weight $SO_3$ and 9.4% by weight Cl are obtained.

Yield: $P_2O5$: 88.7%. $K_2O$: 95.9%.

It will be understood that each of the elements described above, or two or more together, may also find a useful application in other types of conversion processes differing from the types described above.

While the invention has been illustrated and described as embodied in a method for the production of potassium magnesium phosphate, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

We claim:

1. Process for the production of potassium magnesium phosphate by reacting basic magnesium compound with phosphoric acid or phosphate in the presence of a potassium sulfate excess wherefrom the formed potassium magnesium phosphate is separated from the mother liquor, washed with water and dried, comprising stirring into said mother liquor containing magnesium sulfate and potassium sulfate a free calcium oxidic containing material in amounts corresponding to an equimolar ratio of free calcium oxidic and dissolved magnesium sulfate, thereby producing a turbidity, providing an acid pH in said turbidity, separating the solid phase, stirring in potassium sulfate for formation of potassium magnesium phosphate and for maintenance of in said mother liquor the potassium sulfate content, adjusting the pH- of said reaction mixture basic and separating any crystallizate falling out as product from said mother liquor from said reaction mixture, the said mother liquor is then recycled to the process start.

2. Process according to claim 1, wherein said stirring said oxidic material is performed with a mother liquor containing 80–150 g magnesium sulfate and 80–120 g potassium sulfate per 1000 g water.

3. Process according to claim 1, wherein said oxidic calcium is selected from the group comprising calcium oxide and calcium hydroxide.

4. Process according to claim 1, wherein said stirring said oxidic material is performed at a temperature from 60° to 90° C.

5. Process according to claim 1, wherein said providing an acid pH is performed to a value from 2 up to 4.

6. Process according to claim 5, with phosphoric acid, and further comprising separating the acid solution from residue.

7. Process according to claim 1, said adjusting said basic pH by addition of a basic magnesium compound.

8. Process according to claim 7, to a value from 8.0 to 8.6.

9. Process according to claim 1, said separating said any crystallizate in said reaction mixture at a temperature from 30° to 40° C.

10. Process according to claim 1 or 6, said free oxidic material comprising burned, lime-rich crude phosphate, and stirring into said reaction mixture prior to said stirring in potassium sulfate and after said providing said acid pH sulfuric acid, separating calcium sulfate from the solution, remains of said solution recycled as phosphoric acid into said process.

11. Process according to claim 10, wherein the sulfuric acid is added in amounts corresponding to CaO-content of said reaction mixture.

12. Processing according to claim 1, said free oxidic material comprising calcium dihydrogen phosphate.

13. processing according to claim 1, wherein after said stirring said free oxidic material, sedimentation classifying into a solids rich Fraction I, a $Mg(OH)_2$ rich and other solids poor Fraction II and a potassium sulfate solution III, mixing Fraction I with sufficient amounts of phosphoric acid for reacting its $Mg(OH)_2$ content to magnesium dihydrogen phosphate, separating any remaining solids from the liquid phase, stirring with potassium sulfate and the basic magnesium compound, adjusting the pH-value to 8.0–8.6 by addition of Fraction II, separating any forming crystallizate and stirring the same with Fraction III, followed by separating potassium magnesium phosphate.

* * * * *